United States Patent
Park et al.

(10) Patent No.: US 6,526,522 B1
(45) Date of Patent: Feb. 25, 2003

(54) DEFECT AREA MANAGEMENT METHOD OF OPTICAL RECORDING MEDIUM

(75) Inventors: Yong Cheol Park, Kyonggi-do (KR); MyongGu Lee, Kyonggi-do (KR); Jong In Shin, Kyonggi-do (KR); Kyu Hwa Jeong, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/346,391

(22) Filed: Jul. 1, 1999

(30) Foreign Application Priority Data

Jul. 14, 1998 (KR) ............................................. 98-28374
Aug. 10, 1998 (KR) ............................................. 98-33173

(51) Int. Cl.⁷ ............................................. G06F 11/00
(52) U.S. Cl. ............................. 714/8; 714/723; 714/769; 369/47.14; 369/53.15; 369/53.16; 369/53.17; 369/59.25; 369/275.3
(58) Field of Search ............................. 714/8, 723, 769; 369/275.3, 47.14, 59.25, 53.15, 53.16, 53.17

(56) References Cited

U.S. PATENT DOCUMENTS

| | | | | |
|---|---|---|---|---|
| 5,075,804 A | * | 12/1991 | Deyring | 360/49 |
| 5,303,219 A | * | 4/1994 | Kulakowski et al. | 369/53.17 |
| 5,715,221 A | * | 2/1998 | Ito et al. | 369/47.14 |
| 5,745,444 A | * | 4/1998 | Ichikawa et al. | 369/47.14 |
| 5,966,358 A | * | 10/1999 | Mine | 369/47.14 |

* cited by examiner

*Primary Examiner*—Robert Beausoleil
*Assistant Examiner*—Michael Maskulinski
(74) *Attorney, Agent, or Firm*—Birch, Stewart, Kolasch & Birch, LLP

(57) ABSTRACT

A defect area management method of an optical recording medium is disclosed. The present method is capable of managing a defective areas by storing information of defective blocks in the user block upon formatting as well as information of defective replacement blocks by extension of the user area by slipping.

18 Claims, 16 Drawing Sheets

FIG.2A
Background art

| b31 | b30 b29 ...... b24 | b23 ...... b0 |
|---|---|---|
| entry type | reserved | defective sector No |

FIG.2B
Background art

| b63 | b62 ...... b56 | b55 ...... b32 | b31 ...... b24 | b23 ...... b0 |
|---|---|---|---|---|
| FRM | reserved | sector number of first sector in defective block | reserved | sector number of first sector in replacement block |

☐  1 block= 16 sectors

| P_psecA | G1_psecA |

| G2_psecA x16 |

| 1, sblkA, 0 |

FIG.6A
Background art
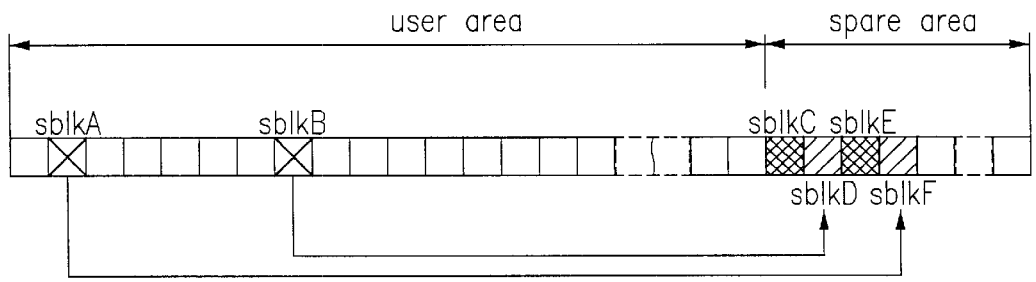
FIG.6B
Background art
0, sblkA, sblkF
0, sblkB, sblkD
FIG.6C
Background art
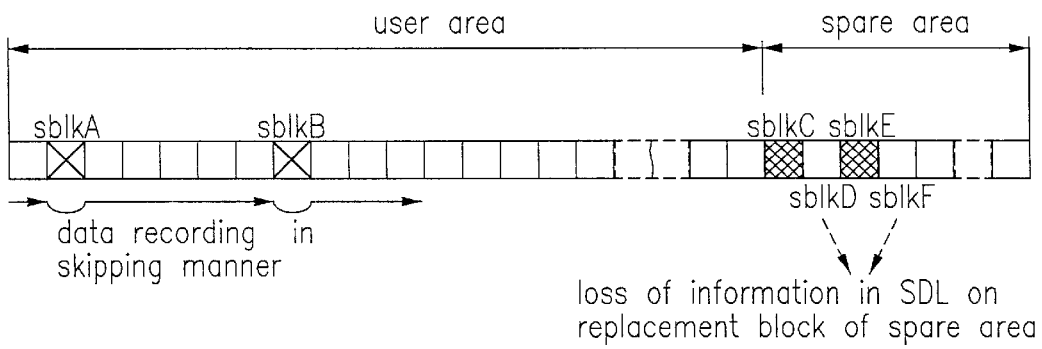
FIG.6D
Background art
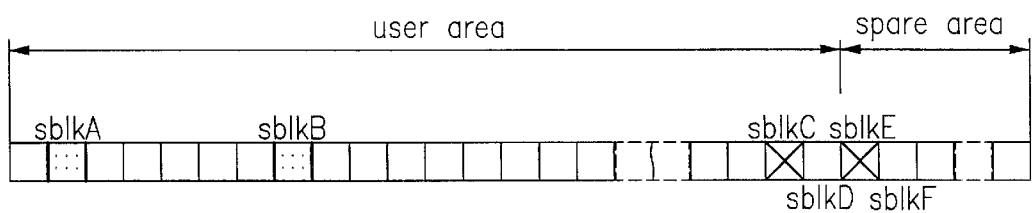

FIG.8B

```
0, sblkA, sblkI
0, sblkB, sblkL
0, sblkC, sblkH
0, sblkD, sblkS
0, sblkE, sblkO
0, sblkF, sblkN
0, sblkG, sblkQ
```

FIG.8C

```
1, sblkJ, 0
1, sblkK, 0
1, sblkM, 0
1, sblkP, 0
1, sblkR, 0
```

⊠ : defective user area
▨ : replacement spare block
▩ : defective spare block

FIG.9B

```
0, sblkD, sblkN
0, sblkE, sblkO
0, sblkF, sblkQ
0, sblkG, sblkS
0, sblkJ, sblkT
0, sblkK, sblkU
```

FIG.9C

```
0, sblkJ, sblkT
0, sblkK, sblkU
0, sblkM, sblkV
0, sblkP, sblkW
0, sblkR, sblkX
```

DEFECT AREA MANAGEMENT METHOD OF OPTICAL RECORDING MEDIUM

BACKGROUND OF THE INVENTION

1. Field of the Invention

The present invention relates to a rewritable optical recording media and more particularly to a defect area management method of an optical recording medium.

2. Discussion of Related Art

A rewritable optical disc generally includes a Rewritable Compact Disc (CD-RW) and a Rewritable Digital Versatile Disc (DVD-RW, DVD-RAM and DVD+RW).

The rewritable optical disc performs repeated operations for recording/playback of information thereon. However, by the repeated operations, a mixture ratio of the mixture forming a recording layer for recording the information on the optical disc is changed from an initial mixture ratio thereof. Thus, the inherent characteristic of the optical disc is not maintained, thereby generating errors during recording/playback of information. This is commonly known as degradation.

The area where degradation occurs is designated as a defect area which appears upon the implementation of formatting, recording and playback commands of the optical disc. The defect area of rewritable optical discs may also be generated due to scratches on the surface, particles such as dust, and errors during manufacturing. Therefore, to prevent data from being recorded on or playback from defect areas of the optical disc, an effective management system for the defect area is necessary.

As shown in FIG. 1, a management system for defect areas on an optical disc is achieved by allocating a defect management area (DMA) in a lead-in area and a lead-out area of the optical disc. Also, a data area is managed in groups, each having a user area for actual recording of data and a spare area for use in case of defects in the user area.

Typically, one disc (e.g. DVD-RAM) has four DMAs, two in the lead-in area and two in the lead-out area. Since managing defect area is important, the same data are held in all four DMAs for data protection. Each DMA includes two blocks and of 32 sectors, wherein one block consists of 16 sectors. The first block (DDS/PDL block) of each DMA includes a disc definition structure (DDS) and a primary defect list (PDL), and the second block (SDL block) includes a secondary defect list (SDL)

More specifically, the PDL represents a primary defect data storage area, and the SDL represents a secondary defect data storage area. The PDL stores entries of all defective sectors generated during manufacture and identified during formatting such as initialization or re-initialization. Each entry, as shown in FIG. 2A, includes a sector number corresponding to a defective sector and an entry type. The sector number is listed in the carry order, and the entry type is listed by the origin of the defective sector.

For example, the entry type is divided into a P-list, a G1-list and a G2-list, as defined by the disc manufacturer. More particularly, the defective sectors generated during the manufacture of the disc are stored in the P-list. The defective sectors found by a certification process during a formatting of a disc are in the G1-list, and the defective sectors converted from the SDL without any certification process are in the G2-list.

On the other hand, the SDL is arranged in block units and holds entries of either defective areas which may be generated after initialization or defective areas which cannot be entered in the PDL during initialization. Each entry of the SDL as shown in FIG. 2B includes an area storing the sector number of a first sector of the block having a defective sector, and an area holding the sector number of a first sector of a replacement block. Additionally, 1 bit is assigned for the FRM. A FRM bit value of '$0b$' indicates that a replacement block is assigned and the block is in a functional state. Contrarily, a FRM value of '$1b$' indicates that either a replacement block is not assigned or a defect on the replacement block exists.

The initializing method of a disc is divided into an initialization formatting and a re-initialization formatting. The re-initialization formatting method is further classified into a full formatting similar to the initialization formatting, a partial certification for a partial initialization, and a conversion of SDL to G2-list by which the SDL is transferred to the G2-list of the PDL without the certification process in order to reduce the formatting time. The P-list remains unchanged after the completion of formatting but defective blocks of the SDL are stored as defective sectors in the G2-list. Thus, the G2-list may include defective sectors as well as non-defective sectors.

As shown in FIG. 3A, in the partial certification, the sectors on the P-list and G1-list prior to the formatting remain on the P-list and the G1-list after the completion of formatting. However, the defective blocks on the old G2-list and old SDL undergo a certification process. Namely, the entries of the G2 list and the SDL are erased, and defective sectors found during the certification process are listed in the G1-list.

This is because non-defective sectors are also entered as part of the defective block on the G2-list and the SDL. At this time, if an overflow occurs on the G1-list, the remaining entries are listed on the new SDL and null data is inserted into the G2-list. An overflow may occur because as the PDL is comprised of 15 fixed sectors in the DMA, the number of entries which is registered in the PDL is restricted.

The conversion format of the SDL to the G2-list without certification is shown in FIG. 3B. The sectors in the P-list, G1-list and G2-list prior to the formatting remain without change in the P-list, G1-list and G2-list after the completion of the formatting. The entries on the SDL are converted into 16 PDL entries and are then listed in the G2-list. At this time, if an overflow occurs on the G2-list, the remaining entries which cannot be entered in the G2-list, are listed on the new SDL.

On the other hand, defective areas in the data area (i.e. defective sectors or defective blocks) are replaced with new non-defective sectors or blocks, respectively by slipping replacement or linear replacement.

The slipping replacement is utilized when a defective area or sector is listed in the PDL. As shown in FIG. 4A, if defective sectors m and n, corresponding to sectors in the user area, are recorded in the PDL, such defective sectors are replaced by the next available sector. By replacing the defective sectors by subsequent available sectors, data is written to a normal sector.

As a result, the user area into which data is written slips and occupies the spare area in the amount equivalent to the defective sectors. For example, if two defective sectors are recorded on the P-list or the G1-list of a PDL, the data is pushed back two sectors into the spare area and is then recorded.

The linear replacement is utilized when a defective area or block is recorded in the SDL. As shown in FIG. 4B, if defective sectors m and n, corresponding to sectors in either the user or spare area, are recorded on the SDL, such defective blocks are replaced by normal blocks in the spare area and the data to be recorded in the defective block are recorded in an assigned spare area. To achieve the replacement, a physical sector number (PSN) assigned to a defective block remains, while a logical sector number (LSN) is moved to the replacement block along with the data to be recorded. Linear replacement is effective for non real-time processing of data.

More particularly, if a replacement block recorded in the SDL has been defective, a direct pointer method is applied in the data registration of the SDL. The defective replacement block is changed into a new replacement block by the application of the direct pointer method. Thus, the entries on the SDL where the defected replacement block has been entered have the sector number of a first sector of the new replacement block.

FIGS. 5A to 5I show an optical disc structure as discussed above. FIG. 5A shows defect areas appearing on the disc and a management state for the defect areas, and FIGS. 5B to 5I show each state indicated in FIG. 5A. In other words, FIG. 5B shows that the disc in FIG. 5A is modeled in a block (=16 sectors) units, and FIG. 5C shows that one defective sector is recorded on the P-list or the G1-list of the PDL. FIG. 5D shows that all 16 sectors of one defective block are recorded on the G2-list of the PDL, and FIG. 5E shows that a block with a defective sector is recorded on the SDL. The information (1, sblkA, 0) is a SDL entry, in which the entries correspond to the FRM, the sector number of the first sector of a defective block, and the sector number of the first sector of a replacement block.

FIG. 5F shows that a defective block of the user area is replaced with the block in the spare area, and is then recorded as an entry of the SDL. The information (0, sblkB, sblkD) indicates that a non-defective block has been assigned, and the data to be recorded on the defective block sblkB of the user area is recorded on the replacement block sblkD of the spare area.

FIG. 5G shows an SDL entry which indicates that an assigned replacement block sblkC of the spare area for the defective block sblkA of the user area is also defective. Therefore, by the application of the direct pointer method, the defective replacement block sblkC is changed into a new replacement block sblkE and the SDL entries are corrected with the information of the new replacement block sblkE. FIG. 5H shows the correcting process of FIG. 5G. At this time, the information on the defective block sblkC of the spare area is erased. In other words, the information remaining on the SDL is (0, sblkA, sblkE) and (0, sblkB, sblkD).

Also, the number of logical sectors on the disc is fixed. Thus, during the re-initialization formatting of the disc, especially during the partial conversion or the conversion of SDL into the G2-list, the spare area can be assigned to the user area by the slipping method. For example, when a disc as shown in FIG. 5A is re-initialized for converting the SDL to the G2-list of the PDL, there is no information on defective blocks of the spare area. Accordingly, considering only the fixed number of logical sectors, irrespective of the defective blocks of the spare area, the user area is pushed into the spare area by the defect area of the user area (or defective sector or block of the user area which is newly registered on the PDL,) such that the user area is assigned as shown in FIG. 5I.

In other words, although block sblkC of the spare area is defective, it is within the normal block of the user area because the information of the block sblkC does not exist as an entry of the SDL.

On the other hand, many defective area management methods for real time recording have been presented. One of such methods is a skipping method in which the linear replacement is not performed when using the SDL, but a data of an encountered defective block is written on a good block subsequent to the defective block as in the slipping replacement. Namely, if the real time recording of input data is not required during the use of the SDL, the linear replacement method is used as shown in FIG. 6A. However, if the real time recording is required, the skipping method is used as shown in FIG. 6C.

Referring to FIG. 6A, assume that blocks sblkA and sblkB of the user area are defective and the blocks sblkC and sblkE of the spare block replacing the defective blocks sblkA and sblkB are also defective. The block sblkA is replaced with the block sblkF of the spare area and block sblkB is replaced with block sblkD of the spare area. As a result, the remaining entries on the SDL have the information (0, sblkA, sblkF) and (0, sblkB, sblkD), shown in FIG. 6B. The information on defective blocks sblkC and sblkE of the spare area is not stored and is thus lost.

Thereafter, if data is rewritten by the skipping method as shown in FIG. 6C for the real time recording on the disc without re-initialization formatting, the information on the replacement blocks sblkD, sblkF of the spare area is not required as entries of the SDL. Furthermore, if the data recorded by the skipping method is to be played back, the data should also be played back by the skipping method.

At this time, if the information on the replacement blocks of the spare area exists as entries of the SDL, the data is undesirably played back in the same manner as the linear replacement method. Thus, the information on the replacement blocks of the spare area should be erased as entries of the SDL.

If the conversion formatting of the SDL into the G2-list of the PDL is performed on the disc where the data is recorded as shown in FIG. 6C, the user area is also slipped into the spare area by the defective blocks of the user area such that the user area is assigned as shown in FIG. 6D. The user area is slipped irrespective of the defective blocks of the spare area because there is no information on the spare area.

In the same manner as above, although block sblkC of the spare area is defective, it is within the normal block of the user area because the information of the block sblkC does not exist as an entry of the SDL.

Thereafter, if the data is written without any certification process of the re-initialization formatting in the skipping or linear replacement manner, the defective block sblkC is extended to the normal block of the user area, such that the data is written. At this time, when recording the data without any certification, the SDL is not created upon the data recording, but it is created upon the playback of data after the recording.

This may result in generation of errors during playback of data. Since block sblkC where the data is already recorded is defective, the data on block sblkC cannot be read during the playback of data. If the data is not read, the data recorded on the block is lost. More particularly, if an important data, such as file system information is recorded on block sblkC, the information loss will have a serious influence to a user.

SUMMARY OF THE INVENTION

Accordingly, an object of the present invention is to solve at least the problems and disadvantages of the related art.

An object of the invention is to provide a defect area management method of an optical recording medium which can store information of a defective spare block in a defect management area to thereby prevent errors generation.

Another object of the invention is to provide a defect area management method of an optical recording medium which can enter information of a defective replacement block contained in a user area on a defect management area upon re-initialization formatting to thereby prevent generation of errors.

Still another object of the invention is to provide a defect area management method of an optical recording medium which can enter information of a defective spare block on a secondary defect list before re-initialization formatting to thereby prevent errors from being generated after the re-initialization formatting.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a defect area management method of an optical recording medium comprises storing on a defect management area information of defective block in the user area upon formatting and storing information of defective replacement blocks within a newly defined user area according to slipping.

The information of defective replacement blocks in the user area is entered in a primary defect list, if overflow is not generated in the defect management area. On the other hand, the information of defective replacement blocks which is not stored in the primary defect list is entered in a secondary defect list, if overflow occurs in the defect management area.

The information of defective blocks in the user area is also registered on the secondary defect list, and information of defective replacement blocks is inferred from the replacement blocks registered in the secondary defect list.

After the information of defective blocks in the user area is converted into the primary defect list of the defect management area, the information of defective blocks within a spare area may be converted into the primary defect list. Also, after the information of defective blocks within the spare area is converted into the primary defect list of the defect management area, the information of defective blocks within the user area may be converted into the primary defect list. Furthermore, the information of defective blocks within the user area and the information of defective block within the replacement area may be converted alternately into the primary defect list of the defect management area.

An overflow may be generated when information of defective blocks in the user area registered on the secondary defect list cannot be registered in the primary defect list during formatting. An overflow may also be generated when information of defective blocks within the spare area cannot be registered in the primary defect list during formatting.

If an overflow occurs on the primary defect list upon formatting where defective blocks of the secondary defect list is converted into the primary defect list without certification, the information of defective blocks within the spare area is not stored. If an overflow occurs on the primary defect list upon formatting where defective blocks registered on the secondary defect list is converted into the primary defect list through a certification process, the position information of defective blocks in a spare area not utilized is stored in a new secondary defect list. However, if an overflow is generated on the primary defect list, the position information of defective blocks in the spare area registered on the new secondary defect list, is not stored.

In the preferred embodiment, the certification process should be applied only to defective blocks of the spare area during formatting.

Upon data recording, a determination may be made whether a replacement block is defective and if defective, the information of defective replacement block is stored in the secondary defect list. The information is converted into the primary defect list, upon formatting.

In the preferred embodiment, only information of defective replacement blocks is stored in the secondary defect list during data recording. The information of a block to be newly replaced is not stored.

According to another aspect of the present invention, a defect area management method of an optical recording medium comprises storing in a primary defect list the information of defective blocks registered on a secondary defect list upon formatting, and storing in the primary defect list the information of defective replacement blocks in a user area. The information of defective replacement blocks in the user area which is not stored in the primary defect list is registered in a new secondary defect list, if overflow occurs in the primary defect list.

According to yet another aspect of the present invention, a defect area management method of an optical recording medium comprises determining whether a replacement block is defective, if defective, storing the information of the defective replacement block in a secondary defect list; and storing the information of the defective replacement block registered on the secondary defect list in a primary defect list upon formatting. If an overflow occurs in the primary defect list upon formatting, the information of defective replacement blocks, which is not converted into the primary defect list, is stored in a new secondary defect list.

BRIEF DESCRIPTION OF THE ATTACHED DRAWINGS

The invention will be described in detail with reference to the following drawings in which like reference numerals refer to like elements wherein:

FIG. 2A shows a general PDL entries structure on the general optical disc of FIG. 1;

FIG. 2B shows a general SDL entries structure on the general optical disc of FIG. 1;

FIGS. 6A to 6D are diagrams depicting the management of the defect area upon real time data recording and the disc state upon re-initialization formatting;

FIG. 8B shows an example of information remaining on the entries of the SDL during the replacement process of FIG. 8A;

FIG. 8C shows an example of the entries on the information of defective blocks of the spare area which may be inferred by using the entries of the SDL during the replacement process of FIG. 8A;

FIG. 9B shows an example of information registered on the new entries of the SDL after re-initialization formatting of FIG. 9A;

FIG. 9C shows another example of information registered on the new entries of the SDL after re-initialization formatting of FIG. 9A;

DETAILED DESCRIPTION OF PREFERRED EMBODIMENTS

Reference will now be made in detail to the preferred embodiments of the present invention, examples of which are illustrated in the accompanying drawings.

A defect area management method of an optical recording medium according to the present invention includes storing information of defective blocks within the spare area in the DMA. An explanation of the information storing method will be given in detail in accordance with the first to third embodiments of the present invention.

First Embodiment

If a defective block is encountered during data recording according to a linear replacement algorithm, the spare areas are sequentially listed in an SDL. Thus, blocks prior to the last replacement block listed in the SDL and which are not registered in the SDL are inferred as defective spare blocks.

According to the first embodiment of the present invention, during a re-initialization formatting where the SDL is converted into a G2-list, both the defective blocks of the user area registered in the old SDL and the inferred defective blocks of the spare area are all converted into the G2-list of the PDL. At this time, if an overflow occurs on the G2-list of the PDL, only the information of defective spare blocks included in the user area is entered in a new SDL.

In other words, information of defective spare blocks not included in the user area after the re-initialization formatting is inferable from the new SDL. Thus, the information of the defective spare block is not stored. In this case, the term 'overflow' is used in an event where the entries of the user area registered in the SDL and the entries of the defective spare block inferable from the SDL cannot all be converted into the PDL.

Figure 7:
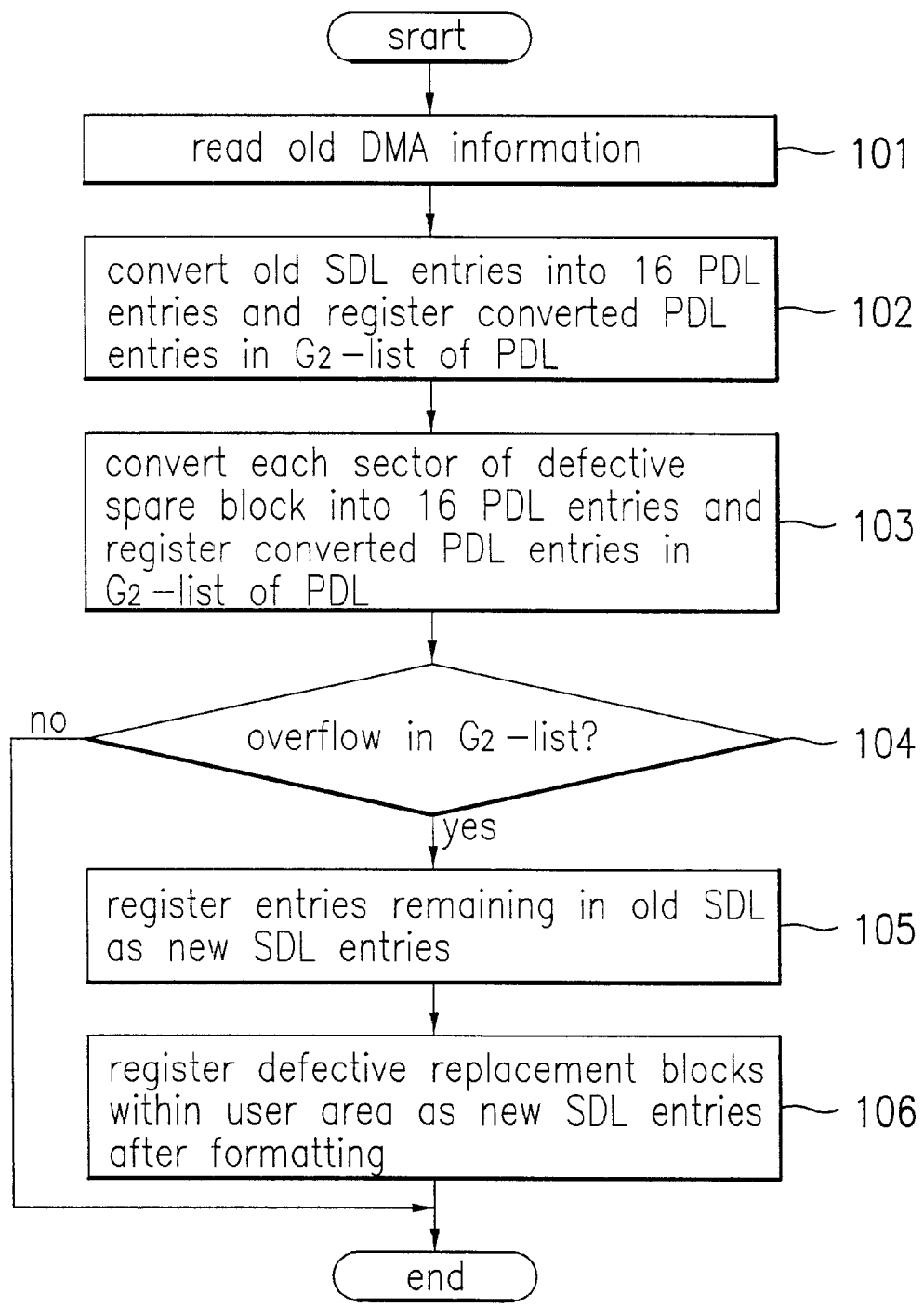
FIG. 7 is a flowing chart illustrating a defect area management method of an optical recording medium in accordance with a first embodiment of the present invention.
Figure 8A:
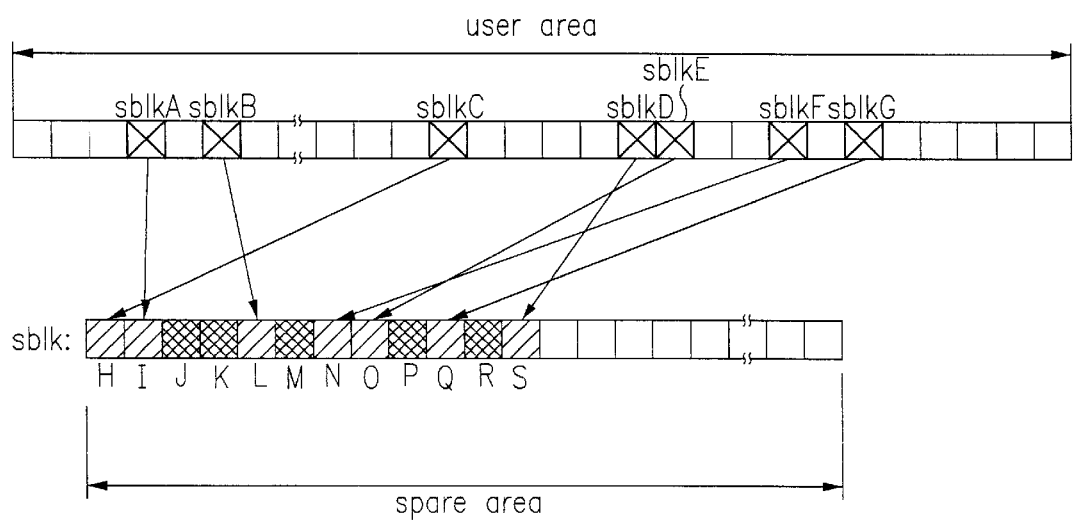
FIG. 8A shows a replacement process where defective blocks of the user area in FIG. 7 are assigned into the replacement block of the spare area.

FIG. 7 is a flowchart illustrating a defect area management method of an optical recording medium in accordance with the first embodiment of the present invention. FIG. 8A shows a replacement process by which replacement blocks in the spare area are assigned to a plurality of defective blocks sblkA~sblkG in the user area. FIG. 8B shows an example of information remaining as the entries of the SDL during the replacement process of FIG. 8A.

In FIG. 8B, the replacement block sblkH for defective block sblkC is prior to replacement block sblkI for defective block sblkA. This may be due to a case where defective block sblkC is encountered prior to defective block sblkA, and accordingly a replacement block is assigned to defective block sblkC prior to defective block sblkA. Also, the block position order may be due to a case where a new replacement block is re-assigned to the defective replacement block by a direct pointer method if the replacement block is defective.

There are 7 defective blocks in the user area of the optical disc shown in FIG. 8A. The information of the seven defective blocks in the user area and the information of non-defective replacement blocks in the spare area are registered as entries of the SDL, as shown in FIG. 8B. Moreover, defective spare blocks, as shown in FIG. 8C, can be inferred using the SDL entries in FIG. 8B.

As sblkS is the last replacement block in the spare area registered in the SDL, defective blocks in the spare area can be obtained by excluding all the listed replacement blocks prior to sblkS. The inferred information of defective blocks in the spare area is shown in FIG. 8C. The block following block sblkS corresponds to a first available spare area after the re-initialization formatting.

Referring to FIG. 7, when re-initialization formatting to convert the SDL into the G2-list is performed without any certification process, the information of the old DMA where the PDL and SDL exist is first read (step 101). The entries of the old SDL as shown in FIG. 8B are converted into 16 PDL entries and the converted PDL entries are then registered in the G2-list (step 102). At the same time, each sector of defective blocks in the spare area inferred as shown in FIG. 8C is also converted into the 16 PDL entries and the converted PDL entries are then registered in the G2-list (step 103).

The listing order in the G2-list of the PDL of the defective blocks in the user area registered in the old SDL and the inferred defective blocks in the spare area may be varied in accordance with the intention of a designer. For example, the defective blocks of the user area registered in the old SDL may be sequentially registered first in the G2-list, followed by the inferred defective blocks of the spare area. Alternatively, the inferred defective blocks of the spare area may be sequentially registered first in the G2-list, followed by the defective blocks of the user area. Moreover, the inferred defective blocks of the spare area and the defective blocks of the user area may be registered at the same time in the G2-list of the PDL. Namely, the inferred defective blocks of the spare area and the defective blocks of the user area can be registered in turn.

In the preferred embodiment, the defective blocks of the user area are sequentially registered in the G2-list of the PDL prior to the inferred defective blocks of the spare area.

Because the number of entries which can be registered in the G2-list of the PDL is fixed, an overflow may be generated during the registration of the entries. Namely, an overflow would occur in the event when the entries of the user area registered in the SDL, shown in FIG. 8B, and the entries of the inferred defective spare blocks, shown in FIG. 8C, cannot all be converted into the G2-list of the PDL.

If an overflow occurs, only a portion of defective blocks in the user block registered in the old SDL and the inferred defective spare blocks is converted into the G2-list of the PDL.

Figure 9A:
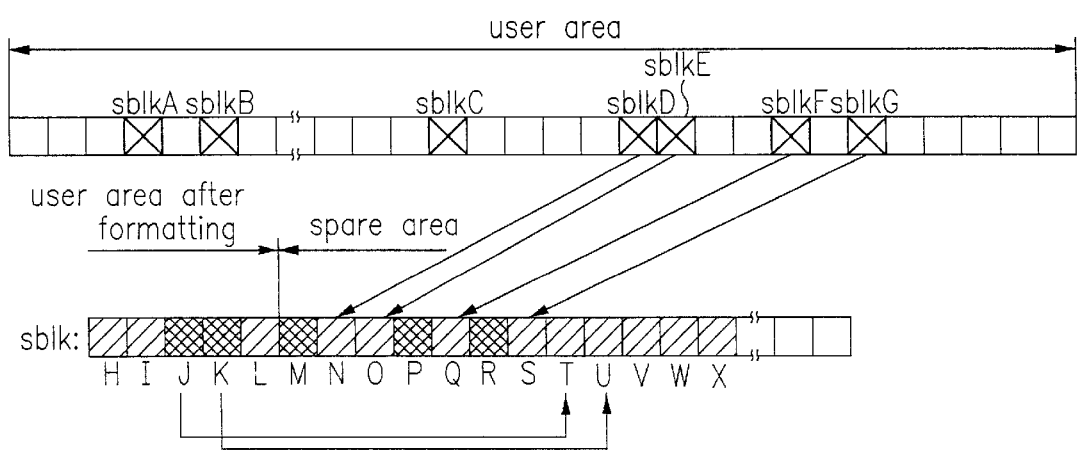
FIG. 9A shows an example of a reassignment of defective blocks of the user area to new replacement blocks on the optical disc, when the user area is extended by the re-initialization formatting of FIG. 7.

For example, if 3 entries sblkA~sblkC of the old SDL shown in FIG. 8B are converted into the G2-list of the PDL because of an overflow, the user area is extended up to sblkL of the spare area, shown in FIG. 9A, due to slipping upon completion of a re-initialization formatting. Since blocks sblkJ and sblkK are known to be defective as the inferred defective spare blocks, they are not assigned as part of the user area during slipping.

Accordingly, the block entries sblkD~sblkG remaining on the old SDL remains on the new SDL entries. However, because the start of the spare area is changed to block sblkN, the replacement blocks in the spare area for the defective blocks of the user area should be newly assigned as shown in FIG. 9A. Note that block sblkM is not designated as the start of the spare block because block sblkM corresponds to one of the inferred defective spare blocks. Examples of the new SDL entries are (0, sblkD, sblkN), (0, sblkE, sblkO), (0, sblkF, sblkQ) and (0, sblkG, sblkS).

If data is written in the user area utilizing only the entries registered in the SDL without certification, the data would be written onto defective blocks sblkJ and sblkK, as sblkJ and sblkK would initially be assumed non-defective. If data is recorded without certification, the SDL is not generated during the recordation of data, but generated at the time of playback. Accordingly, problems encountered in the related art may arise. Namely, because blocks sblkJ and sblkK onto which data has been written are defective, there is significant risk that data could not be read from these blocks. If data cannot be read, the recorded data would be lost.

Therefore, in the present invention, the information of the defective replacement blocks in the user area is also registered as SDL entries upon completion of the formatting (step 106). As shown in FIG. 9A for example, defective replacement block sblkJ in the user area is replaced by replacement block sblkT in the spare area and defective replacement block sblkK is replaced by replacement block sblkU in the spare area. Accordingly, the information (0, sblkJ, sblkT) and (0, sblkK, sblkU) of the replacement blocks is additionally registered in the SDL entries.

When data is written without certification based upon the information of defective blocks registered in SDL through the process in FIG. 7, blocks sblkJ and sblkK would be registered in the SDL as defective. As a result, non real time data may be recorded in replacement blocks sblkT and sblkU rather than onto defective blocks sblkJ and sblkK. Real time data may be written onto the next non-defective blocks following blocks sblkJ and sblkK, thereby skipping defective blocks sblkJ and sblkL. Thus, data would not be read from defective blocks during playback, thereby reducing errors due to lost data.

The information of the defective blocks sblkM, sblkP and sblkR in the spare are, newly designated by the formatting, is not registered in the SDL. This is because the defective blocks of the spare block as shown in FIG. 9B can be inferred using the new SDL entries as explained above with reference to FIGS. 8B and 8C.

On the other hand, the old SDL entries shown in FIG. 8B are converted into the G2-list of the PDL. However, if only one block among the inferred defective blocks of FIG. 8C was converted into the G2-list of the PDL because of an overflow, the user area would be extended up to block sblkT of the spare upon completion of the re-initialization formatting. Thereafter, defective replacement blocks sblkJ, sblkK, sblkM, sblkP and sblkR in the user area, and replacement blocks sblkT, sblkU, sblkV, sblkW and sblkX assigned to the defective replacement blocks are all registered as new SDL entries (steps 105 and 106), shown in FIG. 9C.

If an overflow does not occur in step 104, defective blocks of the user area registered in the old SDL and the inferred defective spare blocks are converted into the G2-list of the PDL. Thus, defective blocks of the spare area are not utilized as part of the user area after the re-initialization formatting.

Second Embodiment

According to the second embodiment of the present invention, if an overflow is generated during a partial formatting process, defective replacement blocks within the user area and defective blocks of the spare area to be used are registered as new SDL entries. Because the information of defective spare blocks to be used as new SDL entries may be inferred from the new SDL, such information of defective spare blocks is not stored.

In other words, during the partial formatting, defective blocks in the spare area may be in one of three situation areas. The defective block may be within the user area or registered in the new SDL. Also, the defective block may be within a spare area, but not utilized in the new SDL even if the block had been utilized in the old SDL.

Figure 10:
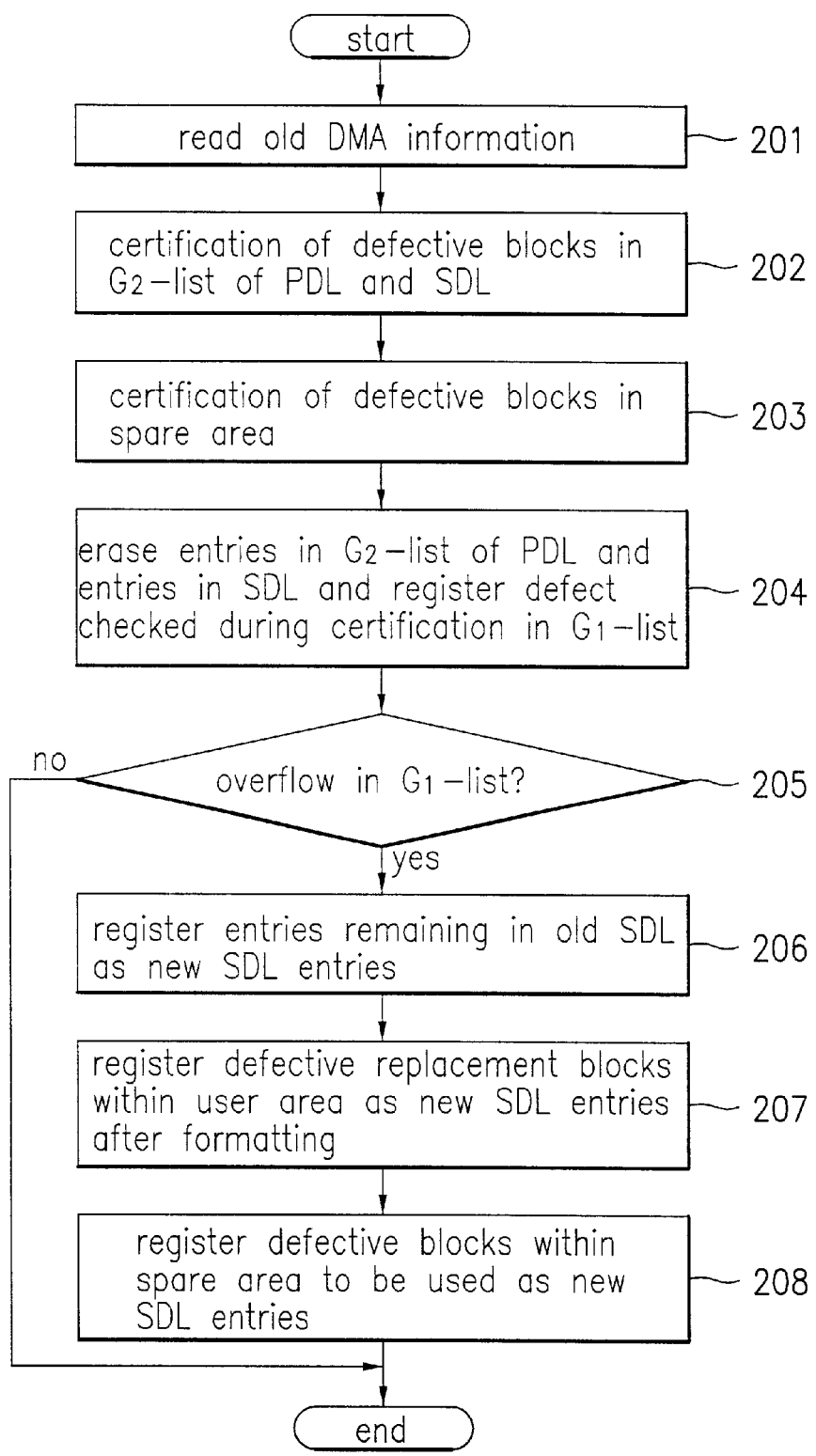
FIG. 10 is a flow chart illustrating a defect area management method of an optical recording medium in accordance with a second embodiment of the present invention.
Figure 11:
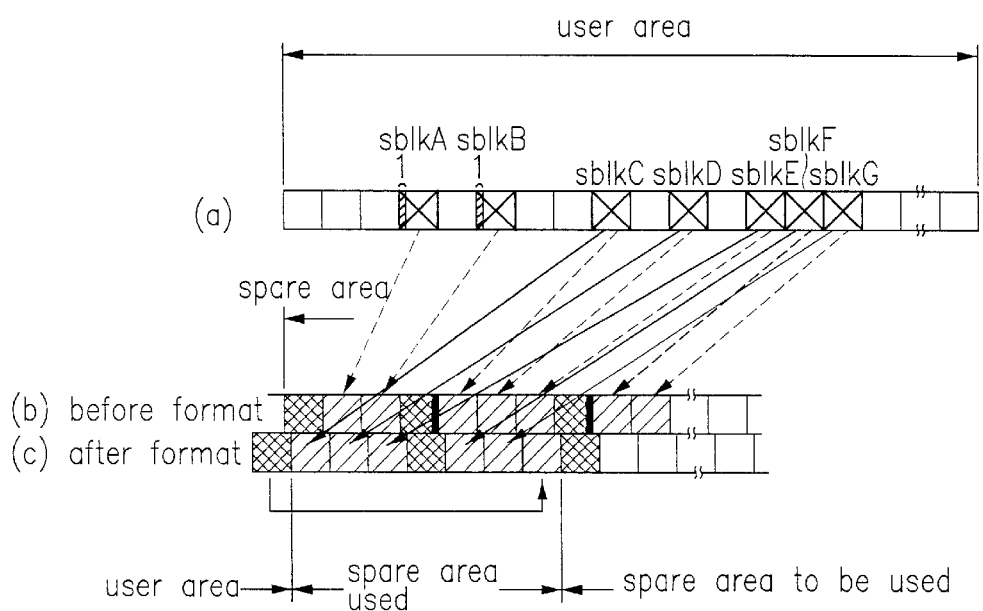
FIG. 11 shows examples of reassignment of defective blocks of the user area to new replacement blocks on the optical disc, when the user area is extended by the re-initialization formatting of FIG. 10.

FIG. 10 is a flow chart illustrating a defect area management method of an optical recording medium in accordance with the second embodiment of the present invention. FIG. 11 shows a,replacement process by which replacement blocks in the spare area are assigned to a plurality of defective blocks in the user area, before and after formatting.

For a partial formatting in which a certification process is included for the SDL and the G2-list of the PDL, the information of the old DMA where the PDL and SDL exist is first read (step 201). Thereafter, defective blocks registered in the old SDL and the G2-list undergo a certification process (step 202). At the same time, the spare area also undergoes a certification process (step 203). However, in order to minimize the time for formatting, the certification process is executed for only defective blocks in the spare area. Namely, the defective blocks of the spare area can be inferred using the old SDL.

Subsequently, after erasing the entries in the G2-list of the PDL and the entries in the old SDL, the defective sectors found by the certification process are registered in the G2-list of the PDL (step 204). The defective blocks corresponding to the inferred defective blocks in the spare area are also registered in the G2-list of the PDL. However, because the number of entries which can be registered in the G2-list of the PDL is fixed, an overflow may be generated during the registration of the entries (step 205).

As explained before, an overflow occurs when the entries of the user area registered in the SDL during the formatting and the entries of the inferred defective blocks in the spare area cannot all be converted into the G2-list of the PDL. If an overflow does not occur, the defective blocks of the user area registered in the old SDL and the G2-list of the old PDL, and the inferred defective blocks of the spare area which are not registered in the SDL are converted into the G2-list of the PDL.

If an overflow occurs, only a portion among defective blocks in the user area registered in the old SDL and the inferred defective spare blocks is converted into the G2-list of the PDL. The entries remaining in the old SDL are registered as the new SDL entries (step 206). Also, because the start of the spare area changes, the replacement blocks in the spare area for the defective blocks of the user area should be newly assigned. Since defective blocks of the old SDL or spare area are converted into the G2-list during the partial formatting, the user area is extended in sector units after formatting.

Assuming two sectors are converted into the G2-list of the PDL due to a generation of an overflow and a defective sector is discovered in two of the SDL entries, the user area is extended by two sectors into the spare area through slipping. If the first block of the spare area is defective and the first or second sector of the defective block is defective, the last block of the extended user area is defective. In other words, the user area includes the defective spare block.

Since the user area extends into the spare area in sector units due to the partial formatting, the block boundary of the spare area after the completion of the formatting is pushed in sector units as shown by (c) in FIG. 11. Namely, the boundary is extended by 2 sectors. Accordingly, upon completion of the partial formatting, the entries remaining in the old SDL must be listed as entries in the new SDL. However, because the starting position or the first block of the spare block has been newly designated, the replacement blocks in the spare area for the defective blocks of the user area are also newly assigned, as shown in FIG. 11.

If data is written in the user area utilizing only the entries registered in the SDL without certification, defective blocks prior to formatting would be assumed non-defective after completion of the formatting. Thus, the data would be written onto defective blocks. Because data has been written onto defective blocks, there is significant risk that data could not be read from these blocks. If data cannot be read, the recorded data would be lost.

As a result, among the positional information of defective replacement blocks within the user area due to the partial formatting, the information which has not been converted into the G1-list of the PDL is registered as new SLD entries,upon completion of the formatting (step 207).

When data is written without certification as in the partial formatting, non real time data would not be written into defective blocks registered in the SDL, and may be recorded in replacement blocks or data may be written onto the next non-defective blocks following the defective blocks, thereby skipping defective blocks. Thus, data would not be read from defective blocks during playback, thereby reducing errors due to lost data.

After formatting, if sectors of defective blocks, other than the first or second sector, in the spare area are discovered to be defective, the blocks in the spare area are re-assigned as shown in FIG. 11(c). More particularly, the blocks of the spare area after formatting, which overlaps the front portion of the defective blocks prior to formatting, are not defective. However, if defective sectors exist within the overlapped portion, the block is defective. This is because a whole block is considered defective, even if one sector of the block is defective. When the certification for defective blocks in the spare area during the partial formatting is completed, the defective blocks may be combined or divided. Typically, the number of the defective blocks is reduced.

Even though the defective blocks of the user area are replaced after the completion of formatting, the spare area used prior to the formatting may remain as the spare area to be used, i.e. non-used spare area. In other words, the highest value of the replacement block in the new SDL entries can be lower than the highest value of the replacement block in the old SDL entries.

For example, FIG. 11(c) shows that defective blocks exist in the spare area to be used. Because the defective block occurs after the last registered replacement block, such defective blocks cannot be inferred utilizing the new SDL. Thus, writing data without certification may cause similar problems encountered in the related art.

To prevent data from being written on such defective blocks, the information of defective blocks within spare area to be used is also registered as new SDL entries (step 208). Only the defective blocks may be registered or the replacement block as well as defective blocks can be registered. Also, since defective blocks within the already used spare area with respect to the new SDL can be inferred from the new SDL, there is no need to store the information of such defective blocks in the SDL.

Third Embodiment

According to the third embodiment of the present invention, the information of defective replacement blocks in the spare area is registered as SDL entries prior to formatting. Upon re-initialization formatting, the SDL where the information of defective replacement blocks has been registered is then converted into the G2-list of the PDL. In order to maintain compatibility with the conventional method, the information of defective replacement block is registered in the SDL.

The defect area management method according to the third embodiment of the present invention is effective when the information on the spare area is lost or when the spare area is full, for example when an optical disc which has been recorded real time by the skipping manner is re-initialized. The present embodiment is especially effective when defective blocks in the spare area cannot be inferred from the old SDL.

Figure 1:
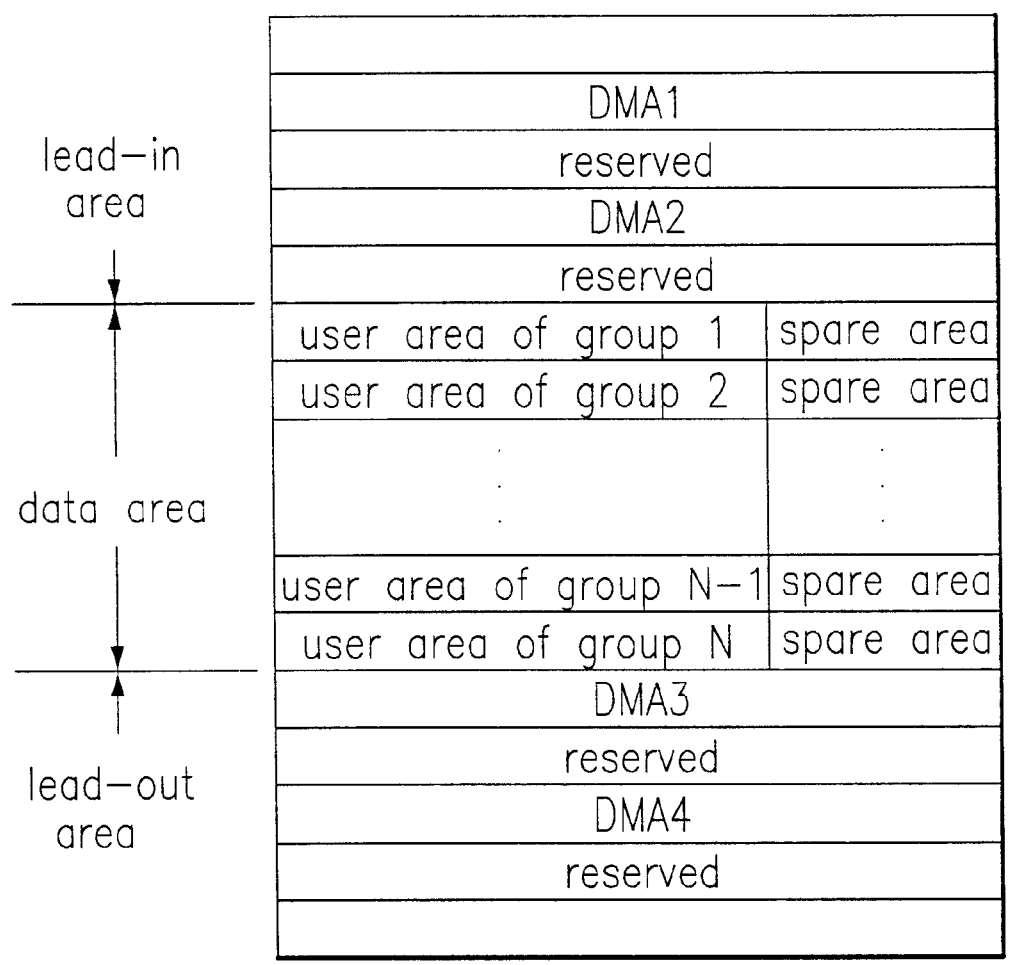
FIG. 1 shows a data area configuration of a general optical disc.
Figure 3A:
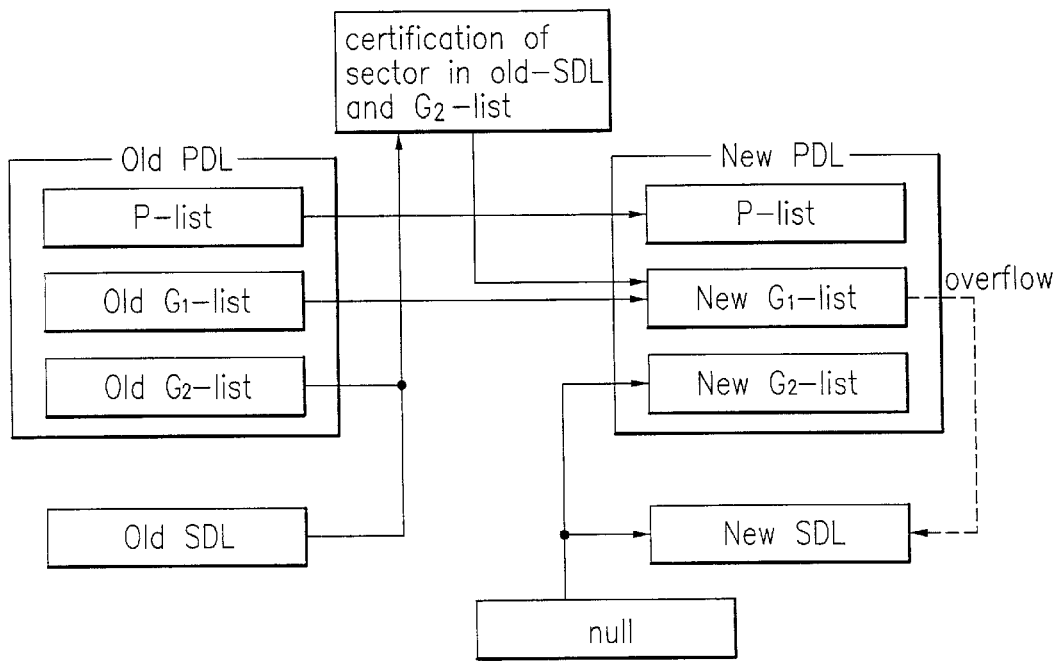
FIG. 3A shows a partial formatting method among general formatting methods.
Figure 3B:
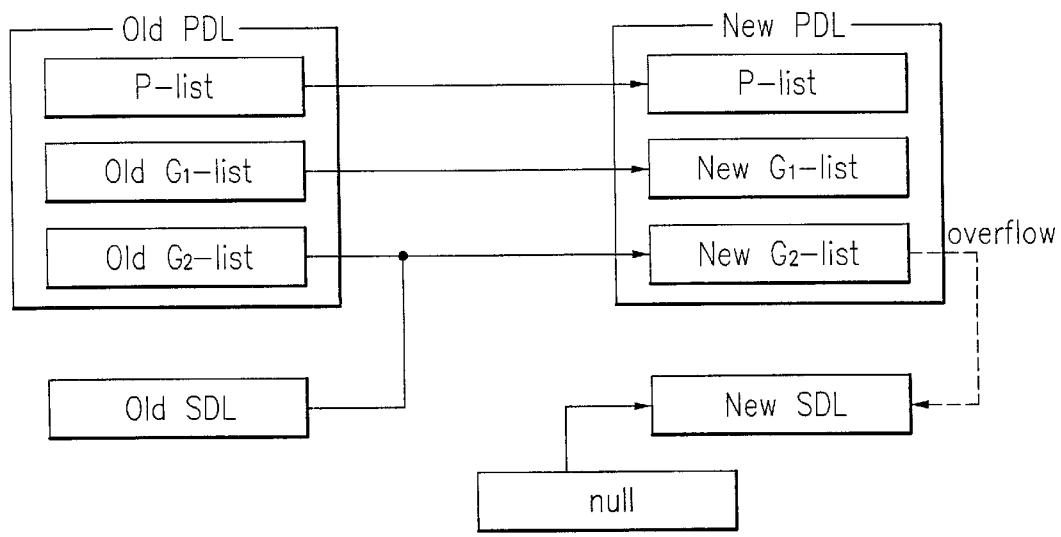
FIG. 3B shows a converting method of an SDL list into a G2-list without data certification among general formatting methods.
Figure 4A:
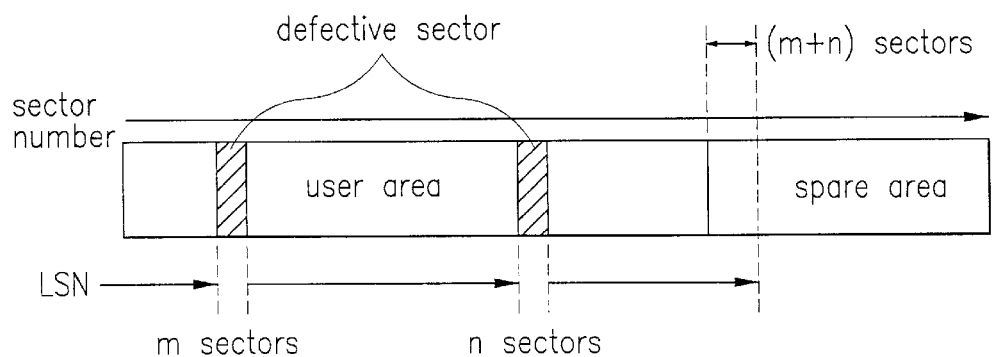
FIG. 4A shows a slipping replacement method for defective blocks in the related art.
Figure 4B:
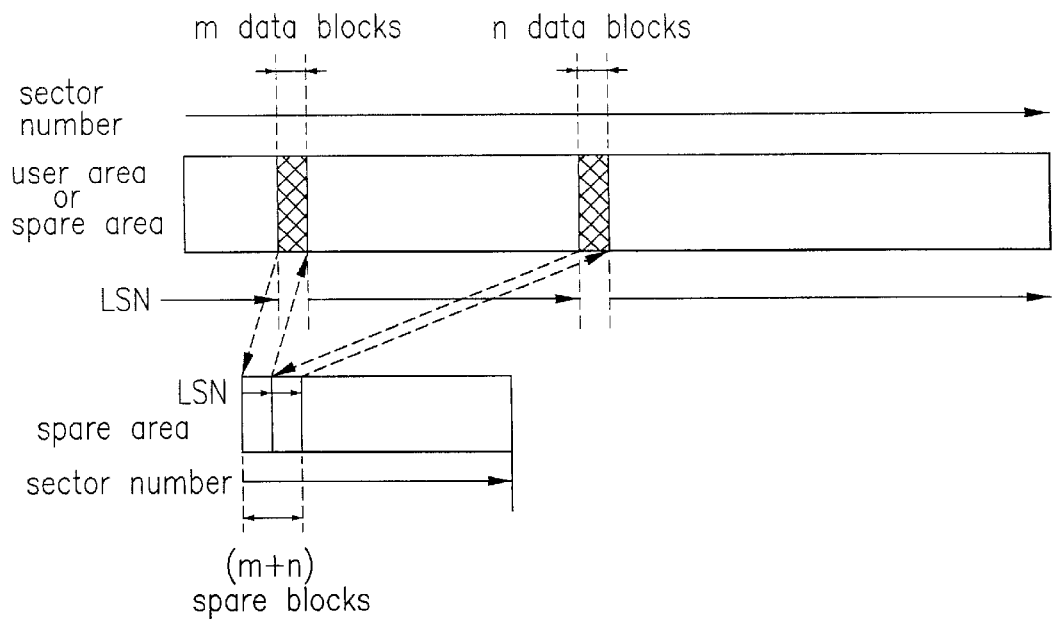
FIG. 4B shows a linear replacement method for defective blocks in the related art.
Figures 5A, 5B, 5C, 5D, 5E:
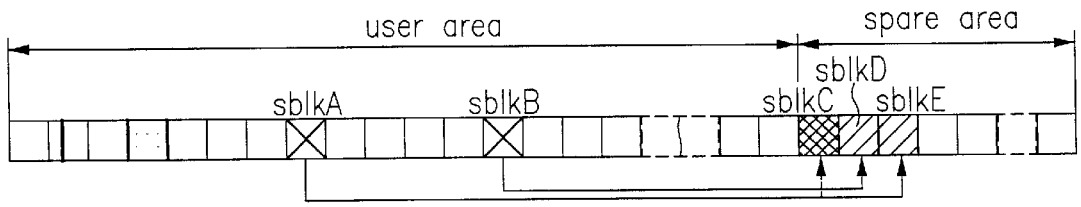
FIGS. 5A to 5I are diagrams depicting management of the defect area appearing on the optical disc of FIG. 1 and the disc state upon re-initialization formatting.
Figure 5F:
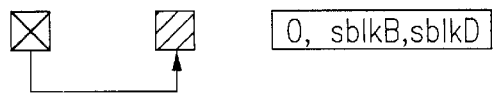
Figure 5G:
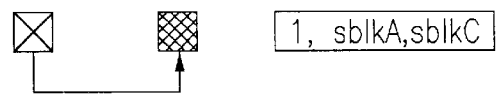
Figure 5H:
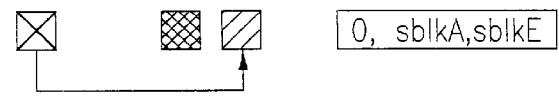
Figure 5I:
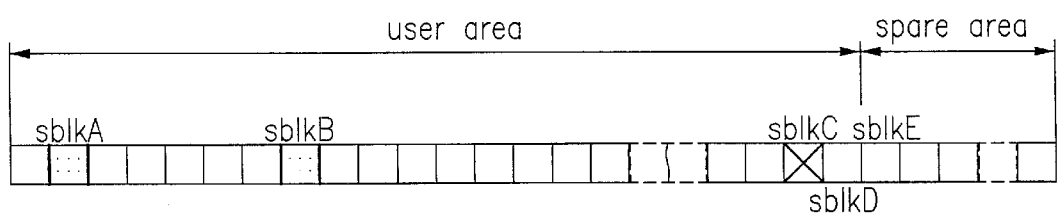
Figure 12A:
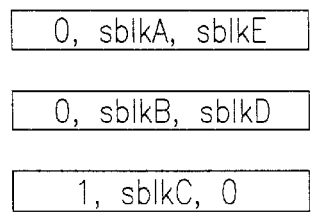
FIG. 12A shows an example of information remaining as entries of SDL by adopting a defect area management method of an optical recording medium in accordance with a third embodiment of the present invention.

Referring to FIG. 5A, if replacement block sblkC of the spare area assigned to defective block sblkA is found to be defective during data writing by linear replacement algorithm, the replacement block sblkC is replaced by a new replacement block sblkE. Thereafter, the SDL entry is corrected as (0, sblkA, sblkE), shown in FIG. 12A, to reflect the information of the new replacement block sblkE. At the same time, however, the information of defective block sblkC is separately registered as a SDL entry (1, sblkC, 0). The value '1' of SDL entry (1, sblkC, 0) indicates that a replacement block has not been assigned to defective block sblkC. Thus, by registering defective blocks found in the spare area, the SDL includes information (0, sblkA, sblkE), (0, sblkB, sblkD), and (1, sblkC, 0).

Figure 12B:
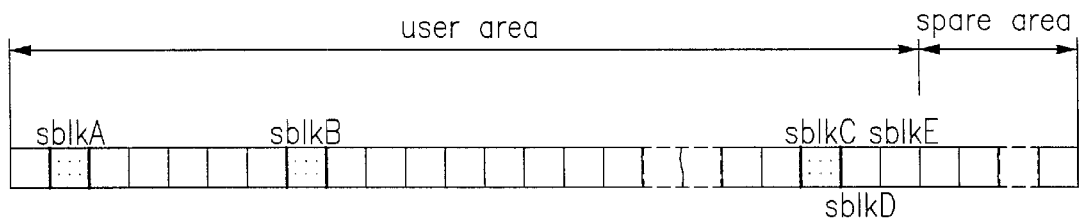
FIG. 12B shows an example of re-initialization formatted disc state by application of the defect area management method in FIG. 12A.

Therefore, upon the re-initialization formatting to convert the SDL into the G2-list of the PDL without certification, the information of defective blocks in the spare area (i.e. sblkC) as well as the information of defective blocks in the user area (i.e. sblkA and sblkB) are converted and transferred. As a result, in consideration of the fixed number of logical sectors, the user area is extended to block sblkE within the spare area by slipping as shown in FIG. 12B. Registered as a defective block in the PDL, defective block sblkC is not assigned as part of the user area during the extension by slipping.

If an overflow occurs in the G2-list of the PDL, the entries remaining in the old SDL which contain information of defective blocks in the spare area are registered in the new SDL.

If data is recorded without certification after the re-initialization formatting through the above process, defective block sblkC is registered in the G2-list. Thus, data would not be written on defective block sblkC. Namely, the defective block is skipped and data is written on a next normal block. Accordingly, information need not be read from defective block sblkC during data playback, thereby reducing errors caused by lost data.

Figure 13A:
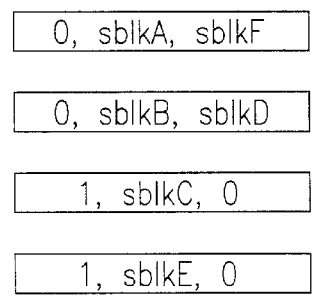
FIG. 13A shows another example of information remaining as entries of SDL by the application of the defect area management method in FIG. 12A.

When the SDL is used for recording real time data recording, the skipping algorithm is applicable in the same manner as described above. More particularly, if replacement blocks sblkC and sblkE of the spare area which replace defective blocks sblkA and sblkB are defective, as shown in FIG. 6A, the defective replacement blocks sblkC and sblkE are replaced by new replacement blocks sblkE and sblkD as shown in FIG. 13A. Next, the information of defective replacement blocks sblkC and sblkE is registered in the SDL as separate entries. As a result, the information of new replacement blocks is registered as SDL entries (0, sblkA, sblkE) and (0, sblkB, sblkD), and the information of defective replacement blocks is registered as SDL entries (1, sblkC, 0) and (1, sblkE, 0).

Thereafter, if real time data is re-written into a disc as shown in FIG. 6A by a skipping algorithm, but without re-initialization, the information of replacements blocks sblkD and sblkF of the spare area is erased in the SDL entries and the information of defective replacement blocks sblkC and sblkE of the spare area is retained. The information remaining in the SDL is (1, sblkA, 0), (1, sblkB, 0), and (1, sblkC, 0), and (1, sblkE, 0).

Figure 13B:
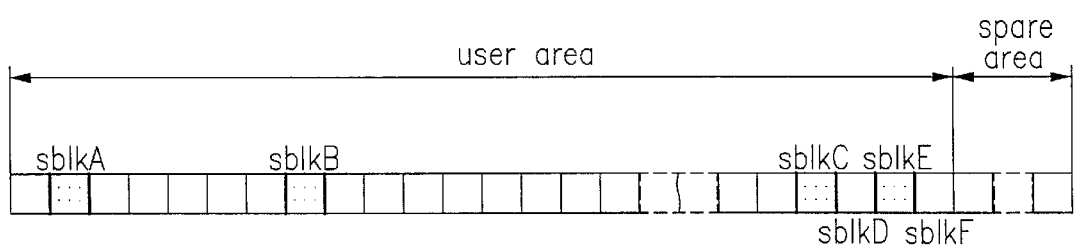
FIG. 13B shows another example of re-initialization formatted disc state by application of the defect area management method in FIG. 13A.

Therefore, upon the re-initialization formatting to convert the SDL into the G2-list of the PDL without certification, the information of defective replacement blocks sblkC and sblkE in the spare area as well as the information of defective blocks sblkA and sblkB are converted and transferred. After completion of the re-initialization, the user area is extended to block sblkF of the spare area by slipping, in consideration of the fixed number of logical sectors, shown in FIG. 13B. As defective replacement blocks sblkC and sblkE are registered in the PDL as defective, the replacement blocks are not assigned as part of the user area upon the extension by slipping.

If data is written without certification after the re-initialization formatting through the above process, data is not written on defective blocks sblkC and sblkE because the position information of blocks sblkC and sblkE is registered in the G2-list in the PDL. The defective blocks are skipped and data is written in the next normal block subsequent the defective blocks. Thus, data need not be read from defective blocks sblkC and sblkE during data playback, thereby reducing error generated due to lost data.

In accordance with the third embodiment of the present invention, the defect area management method of the optical recording medium includes registering information of defective blocks in the spare area as the SDL entries prior to formatting when information of the spare area is erased from the SDL, thereby preventing defective blocks in the spare area from being assigned as normal blocks of the user area upon the re-initialization formatting.

A defect area management method of an optical recording medium in accordance with the preferred embodiments of the present invention includes converting the defective blocks registered in the old SDL and the inferred defective spare blocks into the PDL, upon the re-initialization formatting to convert the SDL into the G2-list of the PDL without certification, when defective blocks in the spare area can be inferred from the SDL. If an overflow occurs in the G2-list of the PDL, the information on defective replacement blocks of the extended user area which is not registered in the PDL is stored as new SDL entries.

The defect area management method of the present invention also includes the storing in the new SDL, upon the partial formatting through the certification process, the information which is not converted into the G1-list in the information of defective replacement blocks within the user area and the information of defective block in the spare area to be used, if an overflow occurs.

Moreover, the defect area management method of the present invention includes registering the information of defective blocks in the spare area in the SDL as separate entries, upon data recording. When defective blocks in the spare area cannot be inferred from the SDL, the information of defective blocks in the PDL during the re-initialization formatting is registered, thereby preventing error generation when defective blocks in the spare area occurs subsequent the user area, after the formatting. This is achieved while maintaining compatibility with existing methods. Particularly, the present embodiment is desirable when the information of defective blocks in the spare area cannot be inferred from the SDL.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A defect area management method of an optical recording medium having a defect management area (DMA), said method comprising:

storing, in the DMA, information of defective blocks in a user area of the optical recording medium upon formatting; and storing, in the DMA, information of defective replacement blocks within an extended user area of the optical recording medium, wherein the information of defective block in the user area and the information of defective replacement blocks are converted alternately into a primary defect list of said DMA.

2. The method of claim 1, wherein if an overflow is generated in the DMA, the information of defective replacement blocks not stored in a primary defect list of the DMA is registered in a secondary defect list.

3. The method of claim 1, wherein the information of defective blocks in the user area is converted into a primary defect list of said DMA prior to the information of defective replacement blocks.

4. The method of claim 1, wherein the information of replacement defective blocks is converted into a primary defect list of the DMA prior to the information of defective blocks.

5. A defect area management method for an optical recording medium having a defect management area (DMA), said method comprising:
- storing, in the DMA, information of defective blocks in a user area of the optical recording medium upon formatting; and
- storing, in the DMA, information of defective replacement blocks within an extended user area of the optical recording medium,
- wherein the information of defective blocks in the user area is registered in a secondary defect list, and the information of defective replacement blocks is inferred from information of non-defective replacement blocks registered in said secondary defect list; and
- wherein the information of defective block in the user area and the information of defective replacement blocks are converted alternately into a primary defect list of said DMA.

6. A defect area management method for an optical recording medium having a defect management area (DMA), said method comprising:
- storing, in the DMA, information of defective blocks in a user area of the optical recording medium upon formatting; and
- storing, in the DMA, information of defective replacement blocks within an extended user area of the optical recording medium,
- wherein the information of defective blocks in the user area is registered in a secondary defect list, and the information of defective replacement blocks is inferred from information of non-defective replacement blocks registered in said secondary defect list;
- wherein the information of defective replacement blocks in the user area is registered in a primary defect list of the DMA, if an overflow is not generated in said DMA;
- wherein said overflow is generated during a formatting when the information of defective blocks which is registered on a secondary defect list and information of inferred defective blocks cannot all be registered in said primary defect list; and
- wherein the information of defective replacement blocks is not stored, if said overflow is generated on said primary defect list upon the formatting where the defective block of said secondary defect list is converted into said primary defect list without certification.

7. A defect area management method for an optical recording medium having a defect management area (DMA), said method comprising:
- storing, in the DMA, information of defective blocks in a user area of the optical recording medium upon formatting; and
- storing, in the DMA, information of defective replacement blocks within an extended user area of the optical recording medium,
- wherein the information of defective blocks in the user area is registered in a secondary defect list, and the information of defective replacement blocks is inferred from information of non-defective replacement blocks registered in said secondary defect list;
- wherein the information of defective replacement blocks in the user area is registered in a primary defect list of the DMA, if an overflow is not generated in said DMA;
- wherein said overflow is generated during a formatting when the information of defective blocks which is registered on a secondary defect list and information of inferred defective blocks cannot all be registered in said primary defect list; and
- wherein if said overflow is generated on said primary defect list upon the formatting where the defective block of said secondary defect list is converted into said primary defect list through a certification process, a position information of defective replacement blocks in a spare area to be used is stored in a new secondary defect list.

8. The method of claim 7, wherein if said overflow is generated on said primary defect list, a position information of defective block in th e spare area registered on the new secondary defect list among said replacement area on which a block boundary is newly defined by slipping, is not stored.

9. The method of claim 7, wherein said certification process is applied only to defective block of said spare area, upon the formatting through said certification process.

10. A defect area management method for an optical recording medium having a defect management area (DMA), said method comprising:
- storing, in the DMA, information of defective blocks in a user area of the optical recording medium upon formatting; and
- storing, in the DMA, information of defective replacement blocks within an extended user area of the optical recording medium,
- wherein the information of defective blocks in the user area is registered in a secondary defect list, and the information of defective replacement blocks is inferred from information of non-defective replacement blocks registered in said secondary defect list;
- wherein if a replacement block is found to be defective during data writing, the information of defective replacement blocks is stored in a secondary defect list and is converted into a primary defect list, upon formatting; and
- wherein only the information of defective replacement block is stored in said secondary defect list and the information of a block to be newly replaced is not stored.

11. A defect area management method for an optical recording medium having a defect management area, said method comprising:
- storing, in a primary defect list, information of defective blocks registered on a secondary defect list upon formatting; and
- storing, in said primary defect list, information of defective replacement blocks in an extended user area among information of defective replacement blocks inferred from non-replacement blocks registered in said secondary defect list;
- wherein if there is a block prior to a replacement block of said replacement area finally used which is not registered in said secondary defect list, said block is inferred as a defective block.

12. The method of claim 11, wherein the information of defective replacement blocks in said user area which is not stored in said primary defect list is registered in a new secondary defect list, if an overflow is generated in said primary defect list.

13. The method of claim 12, wherein said overflow is generated during formatting when the information of defective block in said user area which is registered on said secondary defect list and the information of inferred defective blocks in the spare area cannot all be registered in said primary defect list.

14. A defect area management method of an optical recording medium having a defect management area (DMA), said method comprising:

storing, in the DMA, information of defective blocks in a user area of the optical recording medium upon formatting; and storing, in the DMA, information of defective replacement blocks within an extended user area of the optical recording medium, wherein the information of defective replacement blocks in the user area is registered in a primary defect list of the DMA, if an overflow is not generated in said DMA, wherein said overflow is generated during a formatting when the information of defective blocks which is registered in a secondary defect list and information of inferred defective blocks cannot all be registered in said primary defect list, and wherein the information of defective replacement blocks is not stored, if said overflow is generated on said primary defect list upon the formatting where the defective block of said secondary defect list is converted into said primary defect list without a certification.

15. A defect area management method of an optical recording medium having a defect management area (DMA), said method comprising:

storing, in the DMA, information of defective blocks in a user area of the optical recording medium upon formatting; and storing, in the DMA, information of defective replacement blocks within an extended user area of the optical recording medium, wherein the information of defective replacement blocks in the user area is registered in a primary defect list of the DMA, if an overflow is not generated in said DMA, wherein said overflow is generated during a formatting when the information of defective blocks which is registered in a secondary defect list and information of inferred defective blocks cannot all be registered in said primary defect list, and wherein if said overflow is generated on said primary defect list upon the formatting where the defective block of said secondary defect list is converted into said primary defect list through a certification process, position information of defective blocks in a spare area to be used is stored in a new secondary defect list.

16. A defect area management method of an optical recording medium having a defect management area (DMA), said method comprising:

storing, in the DMA, information of defective blocks in a user area of the optical recording medium upon formatting; and storing, in the DMA, information of defective replacement blocks within an extended user area of the optical recording medium, wherein if a replacement block is found to be defective during data writing, the information of defective replacement blocks is stored in a secondary defect list and is converted into a primary defect list, upon formatting, and wherein only the information of defective replacement block is stored in said secondary defect list and the information of a block to be newly replaced is not stored.

17. A formatting method for an optical recording medium having a defect management area (DMA) including a secondary-defect-list (SDL) and a primary-defect-list (PDL), said method comprising:

(a) reading old DMA information;

(b) converting old SDL entries and a defective replacement block into PDL entries;

(c) determining whether an overflow is generated in PDL entries;

(d) registering old SDL entries which is not converted to PDL entries as new SDL entries when the overflow is generated in the PDL entries at said step (c); and (e) registering a defective replacement block which is not converted to PDL entries as new SDL entries when the overflow is generated in the PDL entries at said step (c).

18. The method of claim 17, wherein said step (e) is preformed after formatting.

* * * * *